United States Patent [19]

Huibers et al.

[11] 4,424,109

[45] Jan. 3, 1984

[54] CATALYST FOR COAL LIQUEFACTION PROCESS

[75] Inventors: Derk T. A. Huibers, Pennington; Chia-Chen C. Kang, Princeton, both of N.J.

[73] Assignee: Hydrocarbon Research, Inc., Lawrenceville, N.J.

[21] Appl. No.: 251,828

[22] Filed: Apr. 7, 1981 (Under 37 CFR 1.47)

[51] Int. Cl.$^3$ ............................................... C10G 1/06
[52] U.S. Cl. ..................................................... 268/10
[58] Field of Search ....................................... 208/10

[56] References Cited

U.S. PATENT DOCUMENTS

| | | | |
|---|---|---|---|
| 3,619,404 | 11/1971 | Rieve et al. | 208/10 |
| 3,630,888 | 12/1971 | Alpert et al. | 208/109 |
| 3,635,814 | 1/1972 | Rieve et al. | 208/10 |
| 4,081,361 | 3/1978 | Hildebrand et al. | 208/10 |
| 4,104,200 | 8/1978 | Cronauer et al. | 208/10 X |
| 4,294,685 | 10/1981 | Kim et al. | 208/10 |

FOREIGN PATENT DOCUMENTS

| | | | |
|---|---|---|---|
| 2735609 | 4/1978 | Fed. Rep. of Germany | 208/10 |
| 2808561 | 8/1978 | Fed. Rep. of Germany | 208/10 |
| 2832858 | 2/1979 | Fed. Rep. of Germany | 208/10 |

Primary Examiner—Delbert E. Gantz
Assistant Examiner—William Albright
Attorney, Agent, or Firm—V. A. Mallare; F. A. Wilson

[57] ABSTRACT

An improved catalyst for a coal liquefaction process; e.g., the H-Coal Process, for converting coal into liquid fuels, and where the conversion is carried out in an ebullated-catalyst-bed reactor wherein the coal contacts catalyst particles and is converted, in addition to liquid fuels, to gas and residual oil which includes preasphaltenes and asphaltenes. The improvement comprises a catalyst selected from the group consisting of the oxides of nickel molybdenum, cobalt molybdenum, cobalt tungsten, and nickel tungsten on a carrier of alumina, silica, or a combination of alumina and silica. The catalyst has a total pore volume of about 0.500 to about 0.900 cc/g and the pore volume comprises micropores, intermediate pores and macropores, the surface of the intermediate pores being sufficiently large to convert the preasphaltenes to asphaltenes and lighter molecules. The conversion of the asphaltenes takes place on the surface of micropores. The macropores are for metal deposition and to prevent catalyst agglomeration. The micropores have diameters between about 50 and about 200 angstroms (Å) and comprise from about 50 to about 80% of the pore volume, whereas the intermediate pores have diameters between about 200 and 2000 angstroms (Å) and comprise from about 10 to about 25% of the pore volume, and the macropores have diameters between about 2000 and about 10,000 angstroms (Å) and comprise from about 10 to about 25% of the pore volume.

The catalysts are further improved where they contain promoters. Such promoters include the oxides of vanadium, tungsten, copper, iron and barium, tin chloride, tin fluoride and rare earth metals.

37 Claims, 1 Drawing Figure

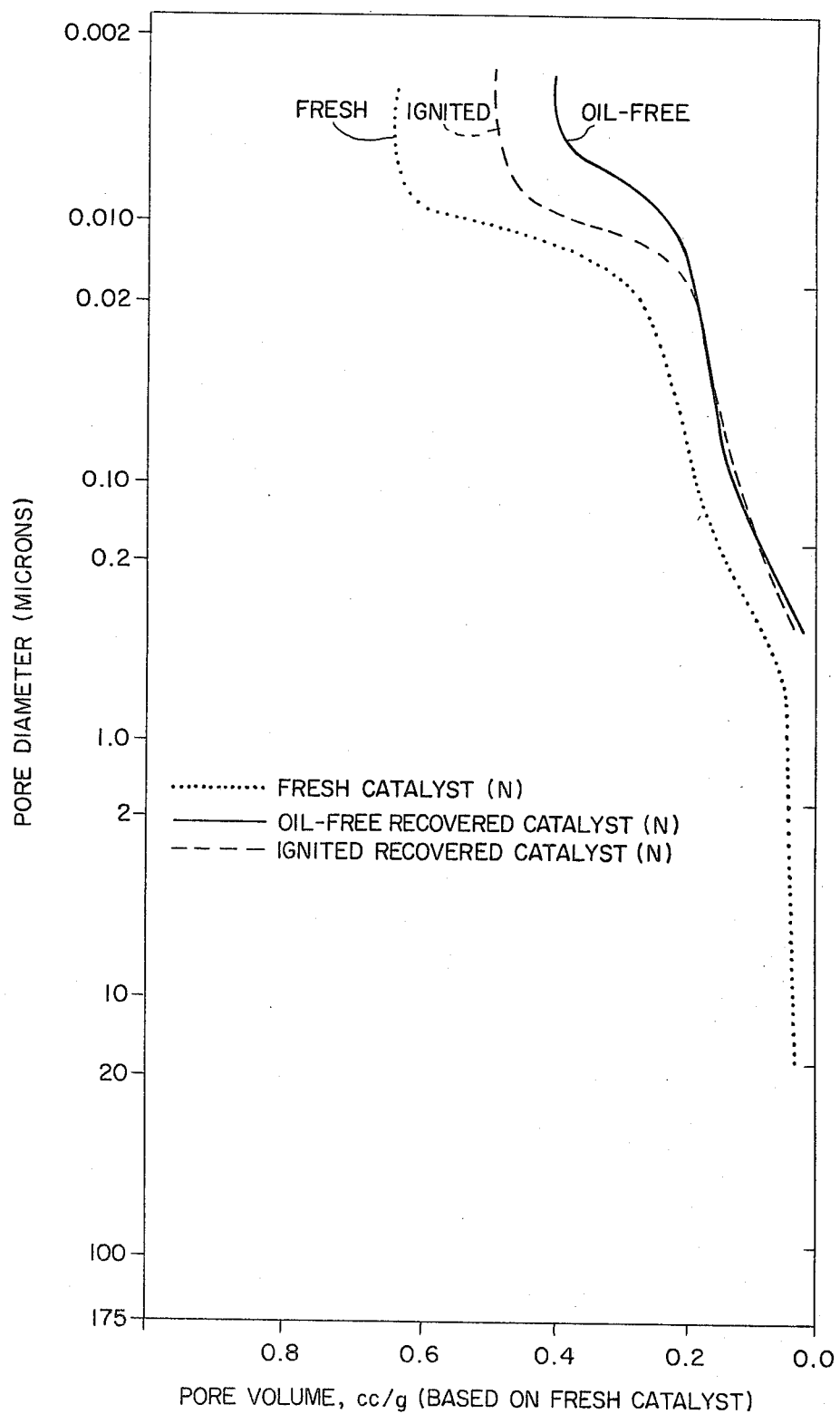

1

CATALYST FOR COAL LIQUEFACTION PROCESS

BACKGROUND OF THE INVENTION

This invention relates to a coal-liquefaction process or more specifically it relates to the catalyst which is used in the so-called H-Coal ® Process, wherein substantial sulfur and nitrogen are removed and coal solids are converted to valuable hydrocarbon oils which may be used more conveniently for fuel and/or heating.

In the H-Coal Process of liquefying coal, the conversion or liquefying takes place in an ebullated-catalyst-bed reactor or hydrogenator. To such apparatus, the coal which is pulverized is fed and mixed with a recycled hydrocarbon oil and administered upward through the ebullated catalyst bed.

In catalytic processes, such as the ebullated-catalyst-bed reaction to which the present invention is related, the expense of the catalyst is a major part of the cost of operation of reactors. This is due to the fact that the activity of the catalyst is maintained by periodic catalyst addition and withdrawal. Thus, if the life of the catalyst or its efficiency can be extended or improved, substantial savings can be realized.

In ebullated-bed-type reactor systems, such as those described in Johanaon, U.S. Pat. No. Re. 25,770 termination of the desired reaction can occur due to the buildup of a sticky, carbonaceous material on the catalyst surface, which deleteriously produces agglomeration of the catalyst and consequent collapse and/or defluidization of the catalyst bed.

Limitations on the operable period and efficiency of catalytic processes are thus especially critical in the treatment or conversion of coal to valuable hydrocarbon oils where more catalyst has not been added and withdrawn. Since there limitations are inevitably present from the feed material utilized therein, adverse affects caused by deposition of materials such as metals derived from coal ash organically chelated metals or other soluble metals. Accordingly, there is no limit to the operable period if catalyst is added and withdrawn.

Also, the residuum that is generated in the coal-liquefaction process will be a problem since it will readily accumulate on the surface and the pores of the catalyst particles. Thus, in order to convert the materials from coal to valuable liquid products, it is necessary to have an efficient and stable catalyst which will provide a high conversion of the residuum of coal which is liquefied. Chelated metals in such feeds as coal or a coal/oil slurry, usually are included in the class of compounds known as porphyrins, and such metals-containing compounds are usually concentrated in the part of a coal residuum known as the preasphaltenes or asphaltol portion. In the conversion of, or the liquefying of the coal, the process generally consists of the conversion of the coal to preasphaltenes and asphaltenes and subsequently to the distillate or liquid products desired from coal. The effect of such metal and carbonaceous material deposition on the efficiency of the catalyst; e.g., in the liquefaction of coal, is such that the efficiency decreases with time on stream in proportion to the materials deposited on the catalyst. This is also true in the case of processes for the high level conversion of petroleum residue or residuum oils. In other words, if preasphaltenes or the like attempt to penetrate into the accessible micropores of the pore structure of the catalyst, they very rapidly clog these micropores and prevent any further travel of feed material through the body of the catalyst.

After the initial attachment of preasphaltenes and the like on the surfaces of the catalysts further access to most of the interior micropores, which comprise the vast majority of reactive surface of the catalyst is therefore prevented by the blockage of the surface micropores. Hence, the prior art catalyst after a relatively short period of time, reaches an inactive or relatively inactive stage, causing inefficiency and essential inoperability of the desired ebullated-catalyst-bed process unless a substantial amount of fresh catalyst is added, and deactivated catalyst is withdrawn.

The process may be termed "inoperable" when any of the combination of factors exist such as agglomeration or defluidization, poor temperature control, etc.

In the past twenty to thirty years, there has been developed an extensive body of art in the catalyst field relating to recognition of the significance of pore structure in catalyst into methods of preparation of catalyst to control the amounts of micropores, intermediate pores and/or macropores contained therein for the purpose of improving the activity of the catalyst. Thus, Anderson Jr. et al, U.S. Pat. No. 2,890,152 discloses desulfurization treatment of petroleum residual using a catalyst having pores with diameters in excess of 1,000 angstroms. Other processes have shown catalysts which have pores that are larger and which are useful in the conversion of coal and other hydrocarbonaceous materials. None of these catalysts have an optimized pore structure that allows a distribution of the reactive surface of the catalyst in such a manner that the initial coal liquefaction products can be hydrocracked significantly from preasphaltenes through asphaltenes to distillate oils, and thereby assuring optimum effectiveness of both the catalyst and the ebullated-catalyst-bed reactor. Therefore, there is a need for improved catalysts as provided by the present invention having various pore sizes to convert the different residuum intermediate materials involved in the liquefaction of coal. With an optimum pore size distribution, the catalytic surface area converts the initial coal liquefaction products to the desired hydrocarbon liquid in an optimum manner.

SUMMARY OF THE INVENTION

An improvement is provided in a coal liquefaction process for converting coal into distillate liquid fuels and minimal residual oil and gas. The process is carried out in an ebullated-catalyst-bed reactor where the coal fed therein contacts a particulate catalyst. The residual oil is comprised of preasphaltenes and asphaltenes. The improvement comprises a catalyst selected from the group consisting of the oxides of nickel and molybdenum, cobalt and molybdenum, nickel and tungsten, and cobalt and tungsten on a carrier of alumina, silica or a combination of alumina and silica. The catalyst has a total pore volume of about 0.005 to about 0.900 cc/g. The total pore volume comprises micropores, intermediate pores, and macropores, and the surface of the intermediate pores is sufficiently large to convert the preasphaltenes to asphaltenes and lighter molecules. The conversion of the asphaltenes takes place on the surface of the micropores. The macropores are for metal deposition and to prevent catalyst agglomeration. In the catalyst, the micropores have diameters between about 50 and about 200 angstroms (Å) and comprise from about 50 to about 80% of the total pore volume and the intermediate pores have diameters between about 200 and 2000 angstroms (Å) and comprise from about 10 to about 25% of the total volume, whereas the macropores have diameters between about 2000 and about 10,000 angstroms (Å) and comprise from about 10 to about 25% of the pore volume. The catalysts are further improved where they contain promotors. Such promotors include vanadium, tin chloride, tin fluoride, tungsten, copper, iron, barium and rare earth metals.

DESCRIPTION OF THE DRAWINGS

FIG. 1 is a graph showing the pore size distribution of catalyst (N), before and after use in a run according to the present invention.

DESCRIPTION OF PREFERRED EMBODIMENT OF THE INVENTION

The following description together with the examples will serve to illustrate the improvements accomplished by the present invention.

In the present coal liquefaction process, the primary object is to convert coal into liquid fuels, preferably distillate liquid fuels. When coal dissolves in the presence of hydrogen, a large fraction of the dissolved coal consists of residual oil that is not distillable. Subbituminous Wyodak coal yields about 45% residual oil, and bituminous Illinois coal gives about 65% residual oil. A lower residual oil content in coal liquid is desirable for more attractive properties such as:

1. a lower viscosity;
2. a lower softening point;
3. easier handling of the feed (e.g., coal/oil slurry);
4. less repolymerization and coking;
5. better ash separation;
6. more valuable products; and
7. less recycle and loss of valuable fractions.

In the conversion of coal to residual oil, the residual oil consists of two fractions (a) asphaltols or preasphaltenes (toluene insoluble), and (b) asphaltenes (toluene soluble). The initial conversion of coal to residual oil is largely non-catalytic. For the conversion of the residual oils, the present process uses a catalyst which has micropores, intermediate pores, and macropores. Accordingly, the preasphaltenes are converted mostly to asphaltenes and then the asphaltenes to distillable oils.

The preasphaltenes have a molecular weight of about 900 and make highly viscous coal liquids which can be pumped at elevated temperatures; i.e., 400° to 500° F. They have a tendency to polymerize.

The asphaltenes have a molecular weight of about 300 and less heteroatoms. A representative empirical formula for asphaltenes is $C_{22}H_{17}NO$. The asphaltenes are more stable and can be handled more easily than preasphaltenes. Both asphaltenes and preasphaltenes can be converted thermally in the presence of hydrogen into distillable oils, naphtha and gas. The preferred way to convert both preasphaltenes and asphaltenes is catalytically.

Properly designed characterized catalyst will selectively cascade the residual oil components into lighter, distillable components with a minimum of hydrogen consumption. The hydrogen consumption is minimized by reducing the formation of gaseous hydrocarbons which originate from the cleavage of saturated aromatic rings and the elimination of side chains.

In the termal process, the saturated ring cracking occurs in competition with char formation (preasphaltenes yield up to 80% char in an inert atmosphere) and aromatization by elimination of hydrogen or through skeletal rearrangement. This limits the conversion of the preasphaltenes and the asphaltenes components by thermal processing and could cause coke building on the walls of the reactor, especially in large-scale operations with a reduced surface to volume ratio of the reactors. These drawbacks in the termal conversion can be partially overcome by hydrogenating the recycle solvent, which makes hydrogen more accessible, as in the Exxon Donor Solvent (EDS) Process. Even in the EDS Process, coal conversion to asphaltenes and lighter products appears to be limited to 70% (80% with a large residual oil recycle).

In the catalytic conversion, the centrally located rings are rapidly adsorbed on the catalyst surface and cracked. As a result, catalytic conversion of preasphaltenes and asphaltenes takes place two to three times faster than in the thermal process and will yield less gas. According to the present process where an ebullated-catalyst-bed reactor is used, it is possible to dissolve coal and convert residual oil at the same time under essentially isothermal conditions. This measure alleviates and reduces a great many operational problems associated with the handling of coal liquids which have a high concentration of residual oil. In the present coal liquefaction (i.e., H-Coal) process, the conversion of coal into distillate liquid fuels is more efficient with improved catalyst as will be illustrated and substantiated below. With this in mind, it is also clear that the conversion of coal is most efficiently provided by catalysts having an optimum pore size distribution as well as an optimum composition.

In developing the proper pore size distribution, it is noted that the pore sizes may be divided into three groups as portions. These portions will include micropores having a pore size diameter ranging from about 50 to about 200 angstroms (Å). A second portion; i.e., intermediate pores, would have a pore diameter ranging from about 200 to 2,000 angstroms (Å), and the third portion; i.e., macropores, would have a diameter ranging from about 2,000 to about 10,000 angstroms (Å).

In providing a catalyst, the pore size and total pore volume are critical in establishing the characteristics and properties of the most effective and efficient catalyst in the conversion of coal to distillate and residual oils. In Tables 1 and 2 below, there is a comparison of specific catalysts and the properties of these catalysts in the conversion of coal to more desirable fuels and oils. That is, the conversion of preasphaltenes and asphaltenes is increased considerably with the optimum pore size distribution of the catalyst used. The conversion by use of the optimum pore size distribution in a catalyst can increase the rate of conversion of preasphaltenes by a factor of two to three.

The catalyst that have been shown to be most effective according to the present invention include oxides of nickel molybdenum, cobalt molybdenum, nickel tungsten, and cobalt tungsten or a combination thereof on a carrier of alumina or silica or a combination thereof. The most preferred catalyst being an oxide of nickel molybdenum on an alumina carrier.

The amount of catalyst that is consumed in the conversion of coal in the ebullated-bed reactor is generally about one pound of catalyst for about every 2000 pounds of coal.

When considering the conversion of residuum oil to valuable hydrocarbon distillates, the following sequence should be considered:

Preasphaltenes→Asphaltenes→Distillates

On the basis of this simplified reaction sequence, it is considered that the surface of the intermediate pores with a pore diameter of 200 to 2000 angstroms (Å) are most effective in converting preasphaltenes and the surface of the micropores with a diameter of about 50 to about 2000 angstroms (Å) is most effective in converting asphaltenes. The catalytic surface characteristics of the intermediate pores are generally the same as the catalytic surface characteristics of the micropores. However, the bulky preasphaltenes are most likely to become immobile if the pores; i.e., micropores, become too narrow. Therefore, an adequate intermediate pore surface in the ctalyst particles should be provided to allow for the conversion of the preasphaltenes to asphaltenes before the preasphaltenes can clog the smaller pores (i.e., micropores). It has been found that catalyst without macropores have a short, comparative life.

The macropores only function as entrance pores. Since they are very large, they do not have much catalytic surface. However, they are useful as entrance pores and for the deposit of metals whereby the clogging of the micropores is substantially prevented.

By the use of the catalyst, which have the optimum pore size distribution, the conversion of coal yields a lower residue oil content.

In the use of the catalyst of the present invention, the total pore volume of the catalyst ranges from about 0.500 to about 0.900 cc/g. As shown in Table 1 below, in the case of Catalyst (N); i.e., the oxides of nickel and molybdenum, the pore volume is about 0.640 cc/g.

According to the present invention, the pore sizes range from about 50 to about 10,000 angstroms (Å). In this total pore volume, the micropores, or first portion thereof, have a diameter ranging from about 50 to about 200 angstroms (Å) and comprise from about 50 to about 80% of the total pore volume. The intermediate pores have diameters ranging from about 200 to about 2,000 angstroms (Å) and comprise from about 10 to about 25% of the total pore volume. The macropores, which are also necessary to maintain the life of the catalyst, have diameters ranging from about 2,000 to about 10,000 angstroms (Å) and comprise from about 10 to about 25% of the total pore volume of the catalyst.

It is preferable to have catalysts which have micropores of a diameter of about 50 to about 150 angstroms (Å) and comprise about 60% of the total pore volume. Also, it is preferable that the intermediate pores have a diameter of about 200 to about 1500 angstroms (Å) and comprise at least about 10% of the total pore volume, and that the macropores have a diameter of about 3,000 angstroms (Å) and comprise at least about 10% of the total pore volume.

The surface area of the catalysts where the asphaltenes are converted ranges generally from about 75 to about 250 mm$^2$/g with a preferable surface area ranging from about 150 to about 190 m$^2$/g.

In the process for conversion of coal by the present liquefaction process, the reaction temperature ranges from about 750° to about 900° F. and the hydrogen partial pressure is between about 2000 and about 3000 psig.

In the use of the present catalysts, they are generally pretreated in a presulfiding operation. In the operation, the catalysts are presulfided with a hydrogen sulfide-hydrogen mixture. The catalysts are also calcined at least 850° F. before being charged to the reactor. The presulfiding operation is generally in situ at atmospheric pressure.

According to the present invention, catalysts may be improved where they contain promoters. These promoters are provided to reduce the adsorption of asphaltenes and thereby increase their conversion rates. The oxides of metals that may be used as promoters include vanadium, tungsten, copper, iron, barium, bismith and chronium. Also, tin chloride and tin fluoride may be used as catalyst promoters, as well as rare earth metals. The rare earth metals that may be used as promoters include samarium, cerium, lanthanum and thorium. Samarium is preferred as a promoter with cobalt catalysts; i.e., the oxides of cobalt and molybdenum. The rare earth metals of lanthanum and thorium are preferable promoters for nickel catalysts; e.g., the oxides of nickel and molybdenum, whereas cerium can be used as a promoter for both cobalt and nickel catalysts. Thorium is effective as a promoter when used in combination with the promoter copper. The preferable promoter for the catalyst is vanadium.

The promoter is most effective where the catalyst contains from about 1.00 to about 2.50 weight percent of the promoter, the preferable range being from about 1.50 to about 1.75 weight percent.

Referring to FIG. 1, there is a graph provided which illustrates the pore distribution of Catalyst (N) before and after use in a run. The properties of the catalyst after use in a run are not substantially affected and the catalyst should be sufficiently active for use in additional runs.

The invention will now be further illustrated by the following example, which demonstrates the versatility in operations involving the conversion of coal with specific types of catalysts.

EXAMPLE

Coal, having 38% by weight of volatile matter and 6% by weight of ash on a moisture-free basis, was pulverized and passed through the 70-mesh screen and then mixed with hydrogen oil in the weight ratio of two parts of oil per part of coal. The coal/oil suspension was then passed upwardly through a hydrogen matter reactor which had a catalyst bed. The hydrogenator contained a mass of nickel-molybdenum catalyst of a mesh size of 4 to 6. The coal/oil suspension flowed upward through the hydrogenator at the rate of about 80 gallons per minute per square foot of horizontal cross-section of the hydrogenator maintained by internal recycle, thereby effecting ebullation of the catalyst particles with approximately 50% expansion of the settled volume of the catalyst mass. Hydrogen was supplied to the bottom of the hydrogenator at the rate of 38,000 standard cubic feet for each ton of coal entering the hydrogenator. The hydrogenation was conducted at a temperature of about 850° F. and a pressure of 2250 pounds per square inch gauge. The effluent, comprising coal and oil suspension, was discharged from the hydrogenator into a separator to form a liquid stream. Part of the liquid stream, which is an oil suspension of unconverted coal and ash particles, was recycled. About 95% of the carbon in the coal was thus converted to liquid and gaseous hydrocarbons, including 170–200 pounds of C$_4$-400° F. for each ton of converted moisture- and ash-free coal.

In evaluating the present catalysts, they were used in several runs operated at similar conditions.

Referring to Table 1 below, there is shown a comparison of the catalysts used in the runs of an ebullatedcatalyst-bed unit. The table provides information for the use of both the standard catalyst, the oxides of cobalt and molybdenum, and Catalyst (N), the oxides of nickel and molybdenum.

TABLE 1
INSPECTION OF FRESH CATALYSTS FOR THE EBULLATED-BED UNIT

| | Catalyst | |
|---|---|---|
| | Standard | Catalyst (N) |
| Bulk Density, g/cc Compacted | 0.580 | 0.704 |
| Particle Density, g/cc | | |
| In Mercury | 0.983 | 1.105 |
| From Weight Dimensions | 0.917 | 1.044 |
| Skeletal Density, g/cc | | |
| In Mercury, 60,000 psig | 2.93 | 3.31 |
| Average Weight of Particles, mg | 9.20 | 8.63 |
| Particle Length, | | |
| Average, mm | 4.69 | 3.96 |
| Range, mm | 2.4–12.0 | 2.2–7.2 |
| Particle Diameter, Average, mm | 1.65 | 1.63 |
| Particle Volume, mm$^3$ | 10.02 | 8.26 |
| Analysis | | |
| Molybdenum, W % | 9.73 | 10.81 |
| Cobalt, W % | 2.75 | — |
| Nickel, W % | — | 2.32 |
| Crush Strength, Lb/mm | 3.2 | 2.1 |
| Attrition Test, % Undersize | 3.9 | 20.4 |
| Pore Volume | | |
| D >30 Å, cc/g | 0.691 | 0.640 |
| Pore Diameter Distribution, cc/g | | |
| D = 30–50 Å | 0.142 | 0.004 |
| D = 50–100 Å | 0.259 | 0.106 |
| D = 100–200 Å | 0.036 | 0.260 |
| D = 200–2000 Å | 0.120 | 0.140 |
| D >2000 Å | 0.134 | 0.130 |
| Maximum, Å* | 55 | 110 |

*Position of greatest slope of pore volume against diameter.

In Table 2, there is a summary of the properties and characteristics of recovered catalysts after use in the runs according to this example. As shown, the pore volume of both recovered ignited catalysts is still sufficient so that they are still active for use in future runs. The standard catalyst lost a significant portion of the pores with diameters below 50 angstroms (Å). It also lost more macropore volume where the metals are deposited, and has more carbonaceous deposit and appears to have lost about 16% of the molybdenum. On the other hand, Catalyst (N) also lost macropore volume due to metals deposition and appears to have lost more of the 50-200 angstroms (Å) micropore volume. Both catalysts could be recovered well. The advantages of Catalyst (N) will become more apparent upon examining the products from the coal conversion.

TABLE 2
ANALYSIS OF RECOVERED CATALYST

| | Catalyst | |
|---|---|---|
| | Standard | Catalyst (N) |
| Catalyst Age, Lb Coal/Lb Catalyst | 950 | 732 |
| Hours of H-Coal Operation | 312 | 300 |
| Sieve Analysis of Washed Solids, W % | | |
| +20 Mesh Extrudate | 89.52 | 84.8 |
| +20 Mesh Lumps | 2.98 | 0.0 |
| 20/30 Mesh | 0.83 | 0.18 |
| 30/100 Mesh | 2.23 | 0.98 |
| 100–325 Mesh | 3.63 | 13.2 |
| 325/Pan | 0.71 | 0.67 |
| +20 Mesh Extrudate | | |
| W % Toluene Soluble | 0.55 | 0.28 |
| Bulk Density, g/cc | 0.898 | 0.981 |
| Oil-Free Extrudate Analysis | | |
| Carbon, W % | 11.58 | 9.98 |
| Hydrogen, W % | 0.98 | 0.70 |
| Sulfur, W % | 3.70 | 5.61 |
| Molybdenum, W % | 6.08 | 7.77 |
| Titanium, W % | 3.27 | 3.19 |
| Iron, W % | 0.52 | 0.99 |
| Pore Volume, D >30 Å, cc/g | 0.291 | 0.289 |
| Weight Loss on Ignition (850° F., 2% O$_2$), % | 16.33 | 14.91 |
| Analysis of Ignited Extrudates | | |
| Carbon, W % | 0.25 | 0.05 |
| Hydrogen, W % | 0.29 | 0.11 |
| Sulfur, W % | 0.97 | 0.59 |
| Molybdenum, W % | 7.70 | 9.93 |
| Pore Volume, D 30 Å, cc/g | 0.511 | 0.447 |
| Pore Diameter Distribution, cc/g | | |
| D = 30–50 Å | 0.030 | 0.004 |
| D = 50–100 Å | 0.239 | 0.118 |
| D = 100–200 Å | 0.047 | 0.151 |
| D = 200–2000 Å | 0.151 | 0.099 |
| D >2000 Å | 0.044 | 0.075 |

The catalysts used in the runs included:

Standard Catalyst—oxides of cobalt and molybdenum

Catalyst (N)—oxides of nickel and molybdenum

Catalyst (X)—oxides of nickel and molybdenum (containing 2% SnCl$_4$ promoter)

In the runs, the conversion to various liquid hydrocarbons included the products (a) $C_1$–$C_3$, (b) $C_4$-400° F., (c) 400°–975° F., and (d) 975° F.+.

Table 3 below, compares the total conversion of coal to hydrocarbon products using the catalysts listed above.

TABLE 3
TOTAL CONVERSION OF ILLINOIS NO. 6 COAL TO HYDROCARBON PRODUCTS*

| Run | Catalyst | Hours of Coal Operation | $C_1$–$C_3$ | $C_4$-400° F. | 400–975° F.+ | 975° F.+ | Coal Conversion, W % |
|---|---|---|---|---|---|---|---|
| 1A | Standard | 72–144 | 8.7 | 18.7 | 32.1 | 31.0 | 93.4 |
| 1B | Standard | 168–240 | 8.7 | 19.9 | 28.4 | 33.6 | 93.4 |
| 1C | Standard | 240–312 | 8.7 | 17.4 | 29.6 | 35.0 | 93.4 |
| 2A | Catalyst (N)** | 60–144 | 8.4 | 19.4 | 36.8 | 25.9 | 91.4 |
| 2B | Catalyst (N) | 168–118 | 8.4 | 17.9 | 33.2 | 31.1 | 91.4 |
| 2C | Catalyst (N) | 228–300 | 8.4 | 18.6 | 31.4 | 32.2 | 92.4 |
| 3 | Catalyst (X) | 64–136 | 9.0 | 17.4 | 45.4 | 16.1 | 93.8 |

*Based on W % of converted MAF coal.
**850° F. estimate based on 830° F. results.

Table 4 below, compares the "secondary" conversion of the initial coal liquefaction products to hydrocarbon products using the catalysts listed above, i.e., Standard Catalyst, Catalyst (N) and Catalyst (X). It assumes that the initial coal liquefaction produces 63.4% 975° F.+, 18.2% 400°–975° F., 6.6% $C_4$-400° F., and 2.9% $C_1$–$C_3$, based on the weight of the converted moisture- and ash-free coal.

TABLE 4
CONVERSION OF THE INITIAL ILLINOIS NO. 6 COAL LIQUEFACTION PRODUCTS TO HYDROCARBONS*

| Run | Catalyst | Hours of Coal Operation | $C_1$-$C_3$ | $C_4$ 400° F. | 400-975° F.+ | 975° F.+ |
|---|---|---|---|---|---|---|
| 1A | Standard | 72-144 | 5.8 | 11.9 | 13.9 | −32.4 |
| 1B | Standard | 168-240 | 5.8 | 13.3 | 10.2 | −29.8 |
| 1C | Standard | 240-312 | 5.8 | 10.8 | 11.4 | −28.4 |
| 2A | Catalyst (N)** | 60-144 | 5.5 | 12.8 | 18.6 | −37.5 |
| 2B | Catalyst (N) | 168-228 | 5.5 | 11.3 | 15.0 | −32.3 |
| 2C | Catalyst (N) | 228-300 | 5.5 | 12.0 | 13.2 | −31.2 |
| 3 | Catalyst (X) | 64-136 | 6.1 | 10.8 | 27.2 | −47.3 |

*Based on W % of converted MAF coal.
**850° F. estimated, estimated on 830° F. results.

In showing the advantages of the present catalysts, the conversion rate of hydrocarbons provided by such catalysts was considered. As shown in Table 5 below, the conversion rates of the catalysts were compared with those of the Standard Catalyst. In the table, the rate constants are provided for Catalyst (N) and Catalyst (X), as compared to that of the Standard Catalyst.

TABLE 5
RATE CONSTANTS OF CATALYST (N) AND CATALYST (X) COMPARED WITH STANDARD CATALYST

|  | Catalyst (N) | Catalyst (X) |
|---|---|---|
| Preasphaltenes | +92% | +177% |
| Asphaltenes | +29% | +111% |
| Heavy Distillate | +40% | +8% |
| Light Distillate | −38% | −31% |

All catalysts deactivate gradually during the course of the runs. However, even at the end of the runs, the catalyst retain a significant activity. In fact, the activity of Catalyst (N) at the end of the run is about similar to that of the Standard Catalyst at the beginning of the run. In the continuous H-Coal Process, catalyst activity is maintained at a certain level of periodic catalyst addition and withdrawal.

In addition to the catalytic cracking reactions, thermal cracking reactions take place. It should be stressed that the thermal reactions occurring in the H-Coal Process are not independent of the catalytic reactions. Thermal reactions occur to a greater extent in the absence of catalytic reactions. On the other hand, in the presence of an active catalyst, thermal reactions occur to a lesser extent.

We claim:

1. In a coal liquefaction process where coal is converted to liquid fuels in an ebullated-catalyst-bed reactor, wherein coal is dissolved in the presence of hydrogen at a sufficiently high temperature and converted to distillate liquid fuels, gas and residual oil, which comprises preasphaltenes and asphaltenes, the improvement comprising catalyst selected from the group consisting of the oxides of nickel and molybdenum, cobalt and molybdenum, cobalt and tungsten, and nickel and tungsten on a carrier of alumina, silica or a combination of alumina and silica, said catalyst having a total pore volume of about 0.500 to about 0.900 cc/g, wherein said total pore volume comprises micropores, intermediate pores and macropores wherein said micropores have diameters between about 50 and about 200 angstroms (Å) and comprise from about 50 to about 80% of said pore volume, said intermediate pores have diameters between about 200 and about 2,000 angstroms (Å) and comprise from about 10 to about 25% of said pore volume, and said macropores have diameters between about 2,000 and about 10,000 angstroms (Å) and comprise from about 10 to about 25% of said pore volume, the surface area of said intermediate pores being sufficiently large to convert said preasphaltenes that have entered the catalyst pores whereby said micropores are not substantially clogged or obstructed for converting said asphaltenes.

2. A process according to claim 1, wherein said catalyst is the oxides of nickel and molybdenum on an alumina carrier.

3. A process according to claim 1, wherein said catalyst is the oxides of cobalt and molybdenum on an alumina carrier.

4. A process according to claim 1, wherein said catalyst is the oxides of cobalt and tungsten on an alumina carrier.

5. A process according to claim 1, wherein said catalyst is the oxides of nickel and tungsten on an alumina carrier.

6. A process according to claim 1, wherein said micropores have a diameter of about 50 to about 150 angstroms (Å) and comprise about 60% of said pore volume, said intermediate pores have a diameter of about 200 to about 150 angstroms (Å) and comprise at least about 10% of said pore volume, and said macropores have a diameter of about 300 angstroms (Å) and comprise at least about 10% of said pore volume.

7. A process according to claim 1, wherein said process is carried out at a temperature from about 750° to about 900° F. and a hydrogen partial pressure of between about 2000 and about 3000 psig.

8. A process according to claim 1, wherein said catalyst contains a promoter selected from the group consisting of the oxides of vanadium, tungsten, copper, iron, barium, bismuth and chromium, tin chloride, tin fluoride, and rare earth metals.

9. A process according to claim 8, wherein said rare earth metals are selected from the group consisting of samarium, cerium, lanthanum and thorium.

10. A process according to claim 8, wherein the promoter is vanadium oxide.

11. A process according to claim 8, wherein the promoter is chromium oxide.

12. A process according to claim 8, wherein the promoter is tungsten oxide.

13. A process according to claim 8, wherein the promoter is tin chloride.

14. A process according to claim 8, wherein the promoter is tin fluoride.

15. A process according to claims 8 and 9, wherein the catalyst is the oxides of cobalt and molybdenum and said promoter is samarium.

16. A process according to claims 8 and 9, wherein the catalyst is the oxides of nickel and molybdenum and said promoter is lanthanum.

17. A process according to claims 8 and 9, wherein said catalyst is the oxides of nickel and molybdenum and said promoter is a combination of the oxide of copper, and thorium.

18. A process according to claims 8 and 9, wherein said catalyst is the oxides of nickel and molybdenum and said promoter is cerium.

19. A process according to claim 8, wherein said catalyst contains from about 1.00 to about 2.50 weight percent of a promoter.

20. A process according to claim 8, wherein said catalyst contains from about 1.50 to about 1.75 weight percent of a promoter.

21. A process according to claim 1, wherein the catalyst has a surface area ranging from about 75 to about 250 m²/g.

22. A process according to claim 1, wherein the catalyst has a surface area ranging from about 150 to about 190 m²/g.

23. In a coal liquefaction process where coal is converted to liquid fuels in an ebullated-catalyst-bed reactor, wherein coal is dissolved in the presence of hydrogen at a sufficiently high temperature and converted to distillate liquid fuels, gas and residual oil which comprises preasphaltenes and asphaltenes, the improvement comprising employing a catalyst with a trimodal pore distribution said catalyst selected from the group consisting of the oxides of nickel and molybdenum, cobalt and molybdenum, cobalt and tungsten and nickel and tungsten on a carrier of alumina, silica or a combination of alumina and silica, said catalyst having a total pore volume of about 0.500 to about 0.900 cc/g and contains a promoter selected from the group consisting of tin chloride, tin fluoride, oxides of vanadium, tungsten, copper, iron, barium, bismuth and chromium, and rare earth metals, wherein said pore volume comprises micropores, intermediate pores and macropores wherein said macropores have diameters between about 50 and about 200 angstroms (Å) and comprise from about 50 to about 80% of said pore volume, said intermediate pores have diameters between about 200 and about 2,000 angstroms (Å) and comprise from about 10 to about 25% of said pore volume, and said macropores have diameters between about 2,000 and about 10,000 angstroms (Å) and comprise from about 10 to about 25% of said pore volume, the surface area of said intermediate pores being sufficiently large to convert said preasphaltenes that have entered the catalyst pores, whereby said micropores are not substantially clogged or obstructed for converting said asphaltenes.

24. A process according to claim 23, wherein said rare earth metals are selected from the group consisting of samarium, cerium, lanthanum and thorium.

25. A process according to claim 23, wherein said catalyst is the oxides of nickel and molybdenum on an alumina carrier.

26. A process according to claim 23, wherein said catalyst is the oxides of cobalt and molybdenum on an alumina carrier.

27. A process according to claim 24, wherein said micropores have a diameter of about 50 to about 200 angstroms (Å) and comprise about 60% of said pore volume, said intermediate pores have a diameter of about 200 to about 1500 angstroms (Å) and comprise at least about 10% of said pore volume, and said macropores have a diameter of about 3000 angstroms (Å) and comprise at least about 10% of said pore volume.

28. A process according to claim 23, wherein said process is carried out at a temperature about 750° to about 900° F. and a hydrogen partial pressure between about 2000 and about 3000 psig.

29. A process according to claim 23, wherein the promoter is vanadium oxide.

30. A process according to claim 23, wherein the promoter is chromium oxide.

31. A process according to claim 23, wherein the promoter is tungsten oxide.

32. A process according to claim 23, wherein the promoter is tin chloride.

33. A process according to claim 23, wherein the promoter is tin fluoride.

34. A process according to claims 23 and 24, wherein the catalyst is the oxides of cobalt and molybdenum, and said promoter is samarium.

35. A process according to claims 23 and 24, wherein the catalyst is the oxides of nickel and molybdenum, and said promoter is lanthanum.

36. A process according to claims 23 and 24, wherein said catalyst is the oxides of nickel and molybdenum, and said promoter is a combination of the oxide of copper, and thorium.

37. A process according to claims 23 and 24, wherein said catalyst is the oxides of nickel and molybdenum, and said promoter is cerium.

* * * * *